United States Patent
Koh et al.

(10) Patent No.: US 7,050,267 B2
(45) Date of Patent: May 23, 2006

(54) HEAD-GIMBAL ASSEMBLY OF HARD DISK DRIVE

(75) Inventors: Jeong-seok Koh, Kyungki-do (KR); Dong-ho Oh, Seoul (KR); Tae-yeon Hwang, Kyungki-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 243 days.

(21) Appl. No.: 10/732,242

(22) Filed: Dec. 11, 2003

(65) Prior Publication Data
US 2004/0190202 A1   Sep. 30, 2004

(30) Foreign Application Priority Data
Mar. 27, 2003   (KR)   ................. 10-2003-0019139

(51) Int. Cl.
*G11B 17/32* (2006.01)
*G11B 21/16* (2006.01)

(52) U.S. Cl. .................. 360/234.6; 360/245.1

(58) Field of Classification Search ............ 360/234.6, 360/245.2, 245.3, 245.4
See application file for complete search history.

(56) References Cited

U.S. PATENT DOCUMENTS

| | | | |
|---|---|---|---|
| 5,761,005 A * | 6/1998 | McKay et al. ......... | 360/234.6 |
| 6,262,868 B1 * | 7/2001 | Arya et al. ............ | 360/290 |
| 6,297,936 B1 * | 10/2001 | Kant et al. ........... | 360/294.4 |
| 6,549,376 B1 * | 4/2003 | Scura et al. .......... | 360/245.3 |
| 6,751,062 B1 * | 6/2004 | Kasajima et al. ...... | 360/234.6 |
| 6,771,466 B1 * | 8/2004 | Kasajima et al. ...... | 360/234.6 |
| 6,771,467 B1 * | 8/2004 | Kasajima et al. ...... | 360/234.6 |
| 6,798,609 B1 * | 9/2004 | Bonin et al. .......... | 360/78.05 |
| 6,867,949 B1 * | 3/2005 | Guo et al. ............ | 360/265.6 |
| 2001/0013993 A1 * | 8/2001 | Coon .................. | 360/234.6 |
| 2002/0041462 A1 * | 4/2002 | Bonin et al. .......... | 360/78.05 |
| 2002/0097663 A1 * | 7/2002 | O'Neill ............... | 369/222 |
| 2003/0011118 A1 * | 1/2003 | Kasajima et al. ...... | 267/141 |
| 2003/0011936 A1 * | 1/2003 | Himes et al. .......... | 360/245.3 |
| 2003/0074783 A1 * | 4/2003 | Boismier et al. ...... | 29/603.03 |
| 2003/0210499 A1 * | 11/2003 | Arya .................. | 360/234.6 |
| 2004/0207957 A1 * | 10/2004 | Kasajima et al. ...... | 360/234.6 |

FOREIGN PATENT DOCUMENTS

JP   2002197823   7/2002

* cited by examiner

*Primary Examiner*—Allen Cao
(74) *Attorney, Agent, or Firm*—Buchanan Ingersoll PC

(57) ABSTRACT

A head-gimbal assembly of a hard disk drive includes a loadbeam connected to a pivot arm, a slider on which a magnetic head is mounted, an elastic support member having one end coupled to the loadbeam and the other free end portion at which the slider is supported, and a damper provided between the loadbeam and the slider to attenuate vibration transferred between the loadbeam and the slider.

4 Claims, 8 Drawing Sheets

HEAD-GIMBAL ASSEMBLY OF HARD DISK DRIVE

BACKGROUND OF THE INVENTION

This application claims the priority of Korean Patent Application No. 2003-19139, filed on 27 Mar. 2003, in the Korean Intellectual Property Office, the disclosure of which is incorporated herein in its entirety by reference.

1. Field of the Invention

The present invention relates to a head-gimbal assembly (HGA) of a hard disk drive, and more particularly, to a head-gimbal assembly of a hard disk drive having an anti-vibration function to prevent transfer of vibrations to a slider where a magnetic head is mounted.

2. Description of the Related Art

In a typical hard disk drive, as shown in FIG. 1, a hard disk D for recording predetermined information is rotated by a spindle motor 40. An actuator including a pivot arm 20 having a head-gimbal assembly (HGA) 10 and a voice coil motor 30 pivoting the pivot arm 20 is provided at one side of the hard disk D. Thus, when information is recorded and reproduced with respect to the hard disk D, the spindle motor 40 is rotated to rotate the hard disk D. The voice coil motor 30 moves the pivot arm 20 to move a magnetic head 11 (refer to FIG. 2) which is mounted on HGA 10 to a desired track position on the hard disk D so that recording and reproduction is performed.

HGA 10, as shown in FIGS. 2 and 3, includes a base plate 16 coupled to the pivot arm 20, a loadbeam 15 connected to the base plate 16 via a hinge member 14, a slider 12 on which the magnetic head 11 is mounted, and an elastic support member 13 having one end coupled to the loadbeam 15 and the other free end portion at which the slider 12 is supported. Reference numeral 15a denotes a load point provided at the bottom surface of the loadbeam 15. The load point 15a contacts a portion of the elastic support member 13 where the slider 12 is supported and provides a load thereto.

However, in HGA 10 having the above structure, it is a problem that the loadbeam 15 is vibrated due to air flow or the vibration of the actuator and the vibration of the loadbeam 15 is transferred directly to the slider 12, via the load point 15a. That is, since the load point 15a and the slider 12, which are both rigid bodies, contact each other via the elastic support member 13 which is a rigid body as well, the vibration of the loadbeam 15 is transferred to the slider 12 without attenuation. Also, the vibration of HGA 10 become large since the vibration of the slider 12 generated by the excitation of air flow and disk vibration during the rotation of the disk D is not attenuated. As a result, a position error signal of the magnetic head 11 increases. The position error signal in a hard disk drive is generated mainly due to the vibration generated during the rotation of the spindle motor 40 and the disk D and the vibration of HGA 10. A position error signal energy over a 3 kHz frequency is generated by the vibration of HGA 10. However, since a vibration over 3 kHz is typically out of a bandwidth of a servo control system of a hard disk drive, actually, it is impossible to control to attenuate the vibration. Considering that a demand of a large capacity hard disk with an increased track density is common in these days, the position error signal in an uncontrollable scope may act as a major factor to lower reliability of a product. Therefore, an HGA having a new structure to solve the above problem is needed.

SUMMARY OF THE INVENTION

To solve the above and other problems, the present invention provides an HGA of a hard disk drive having an anti-vibration function to prevent transfer of vibrations to a slider where a magnetic head is mounted.

According to an aspect of the present invention, a head-gimbal assembly of a hard disk drive comprises a loadbeam connected to a pivot arm, a slider on which a magnetic head is mounted, an elastic support member having one end coupled to the loadbeam and the other free end portion at which the slider is supported; and a damper provided between the loadbeam and the slider to attenuate vibration transferred between the loadbeam and the slider.

BRIEF DESCRIPTION OF THE DRAWINGS

The above and other features and advantages of the present invention will become more apparent by describing in detail preferred embodiments thereof with reference to the attached drawings in which.

DETAILED DESCRIPTION OF THE INVENTION

Figure 1:
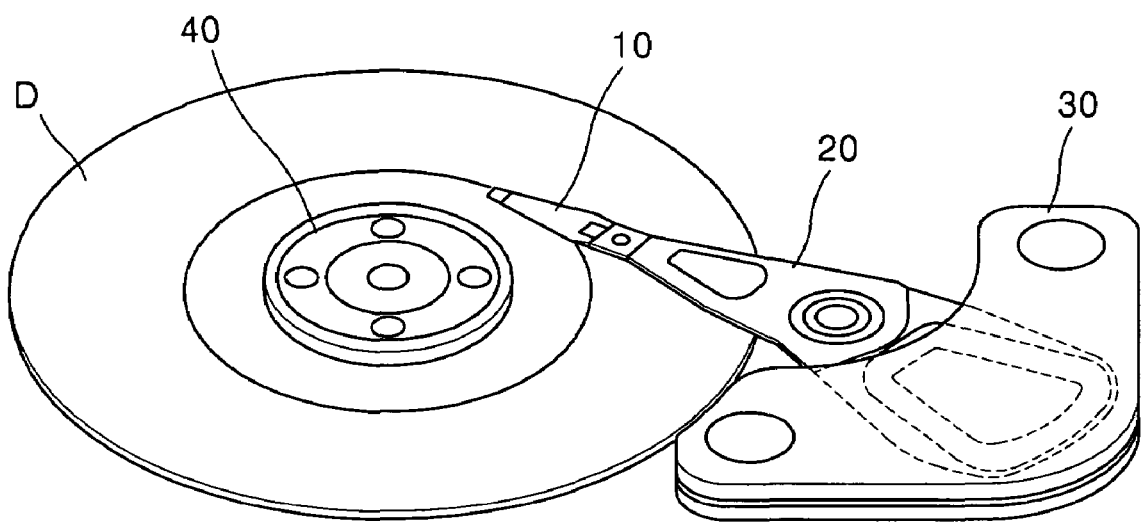
FIG. 1 is a perspective view illustrating the structure of a typical hard disk drive.
Figure 2:
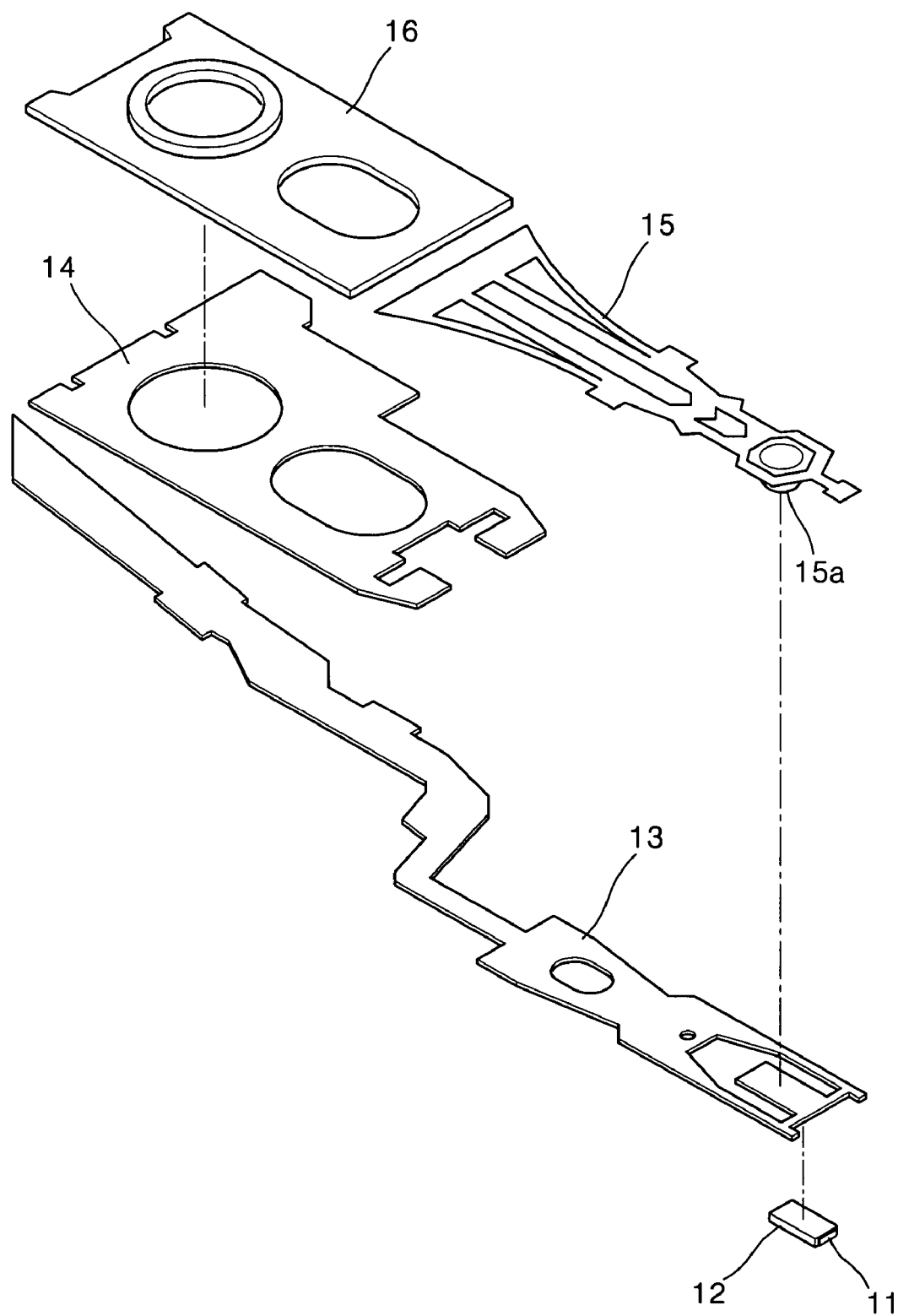
FIG. 2 is an exploded perspective view illustrating a conventional HGA.
Figure 3:
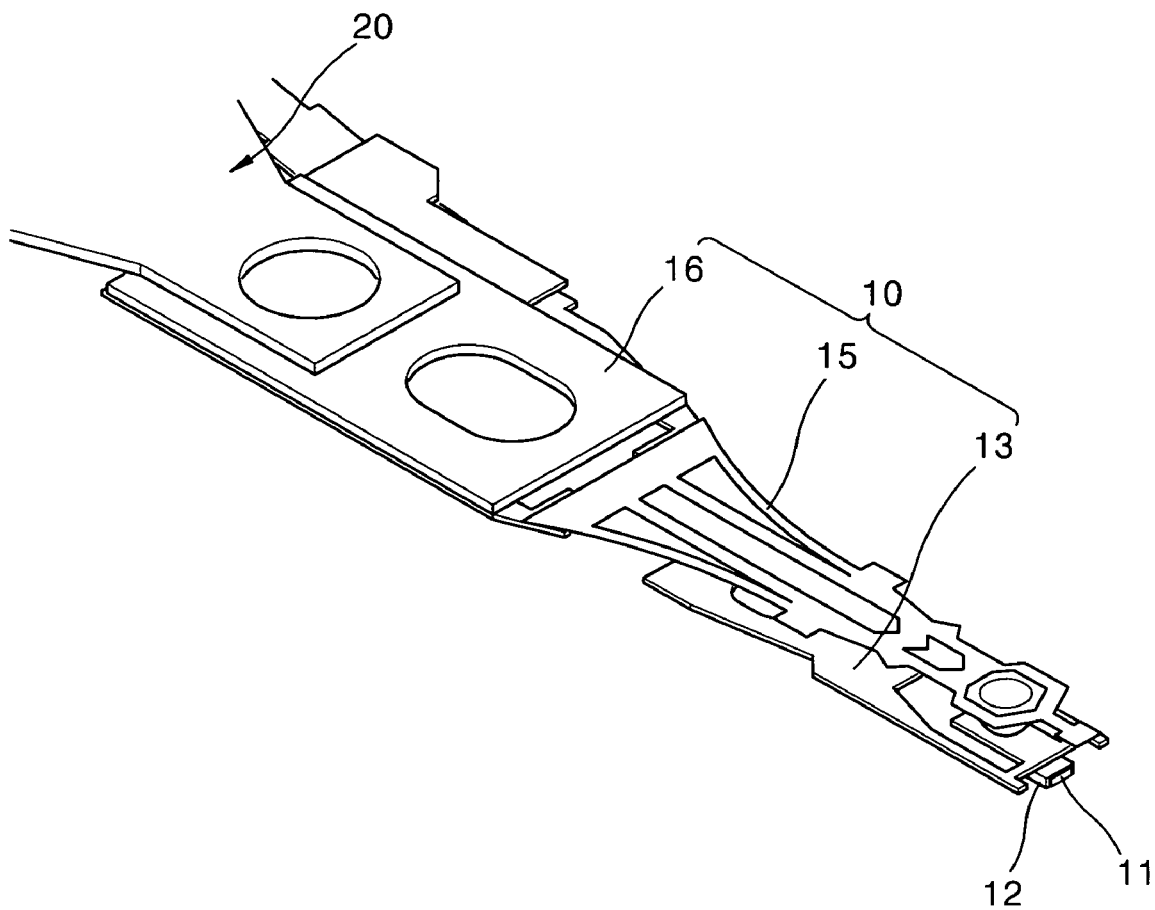
FIG. 3 is a perspective view illustrating HGA of FIG. 2 in an assembled state.
Figure 4:
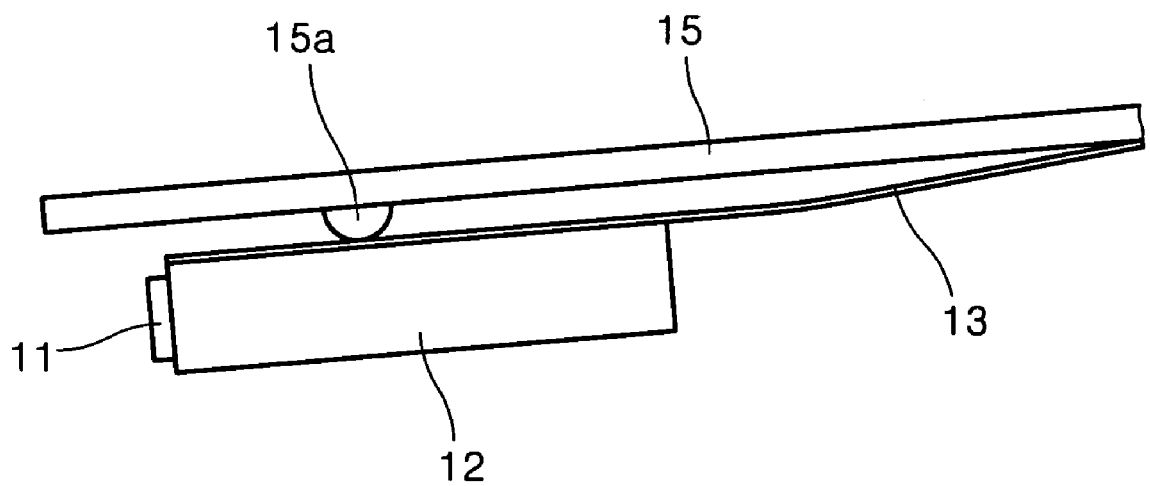
FIG. 4 is a side view illustrating HGA of FIG. 3.
Figure 5:
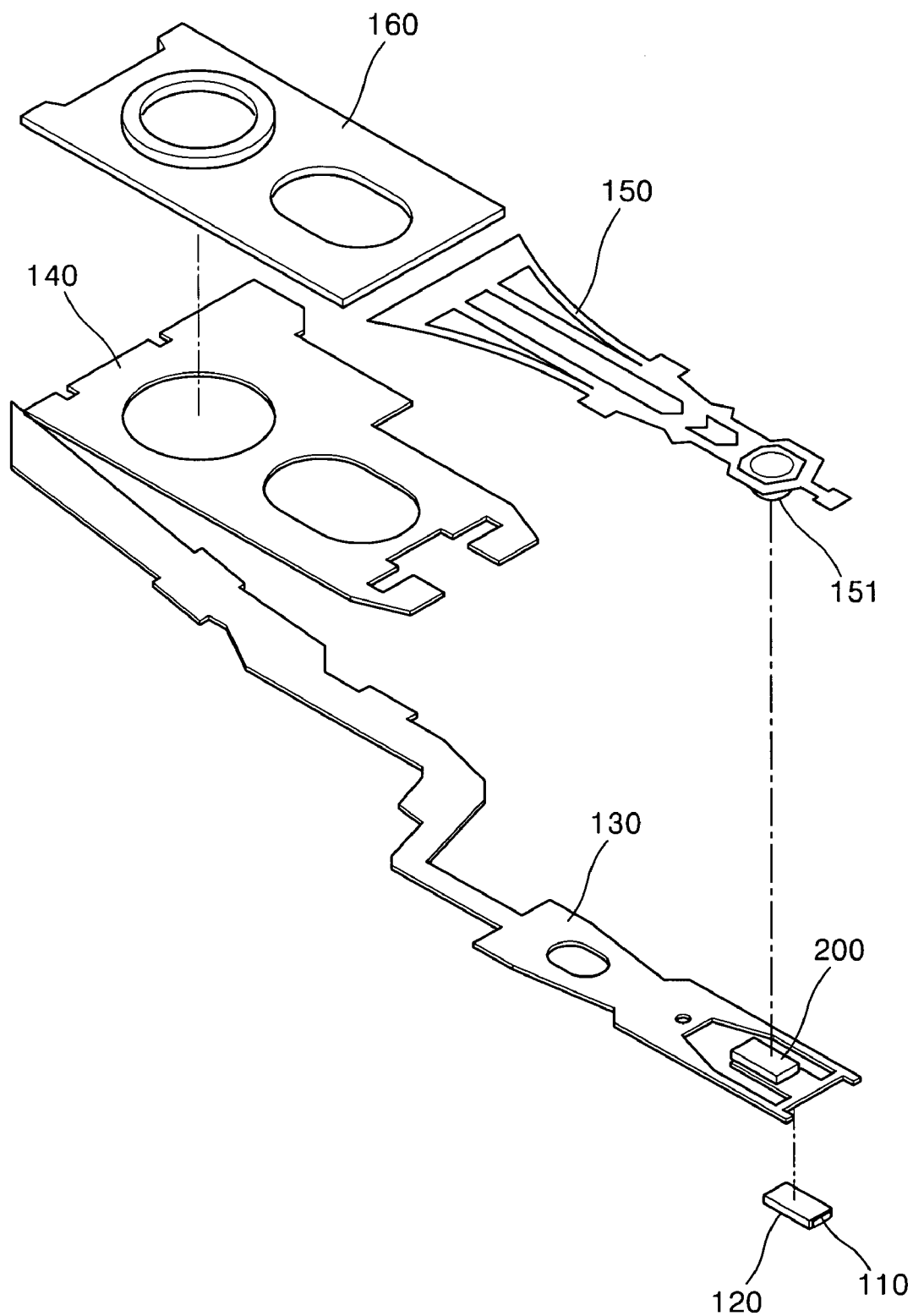
FIG. 5 is an exploded perspective view illustrating HGA according to a preferred embodiment of the present invention.
Figure 6:
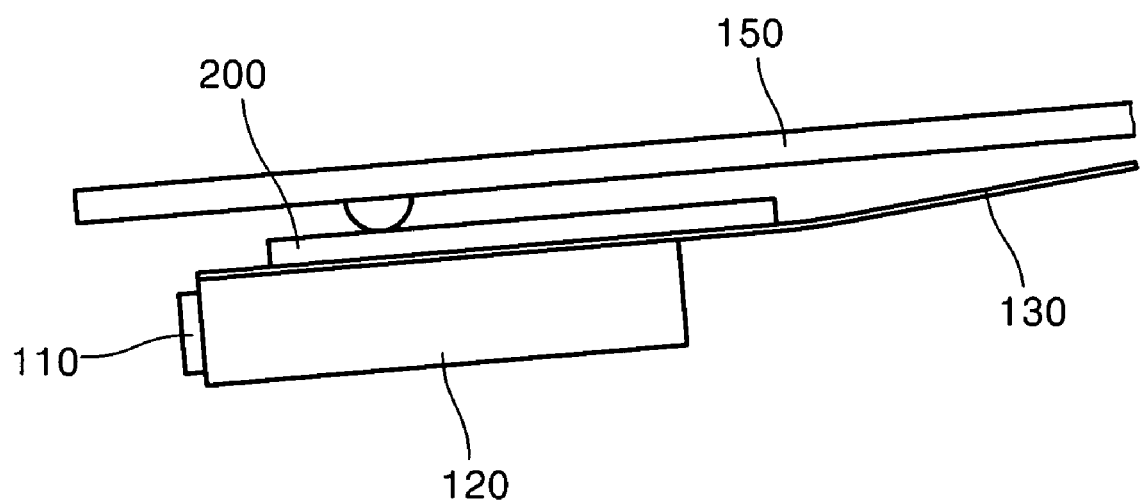
FIG. 6 is a side view illustrating an assembled state of HGA of FIG. 5.

FIGS. 5 and 6 show HGA of a hard disk drive according to the present invention. As shown in the drawings, an HGA according to embodiments of the present invention includes a base plate 160 coupled to the pivot arm 20 of FIG. 1, a loadbeam 150 connected to the base plate 160 via a hinge member 140, a slider 120 on which a magnetic head 110 is mounted, an elastic support member 130 having one end coupled to the loadbeam 150 and the other free end portion at which the slider 120 is supported, and a damping member 200 provided between the elastic support member 130 and a load point 151 installed at the bottom surface of the loadbeam 150.

The damping member 200 performs a function to attenuate vibration transferred between the slider 120 and the loadbeam 150 via the elastic support member 130. For example, a damper made of a plastic material which is light and has an attenuation function can be preferably adopted.

Figure 7A:
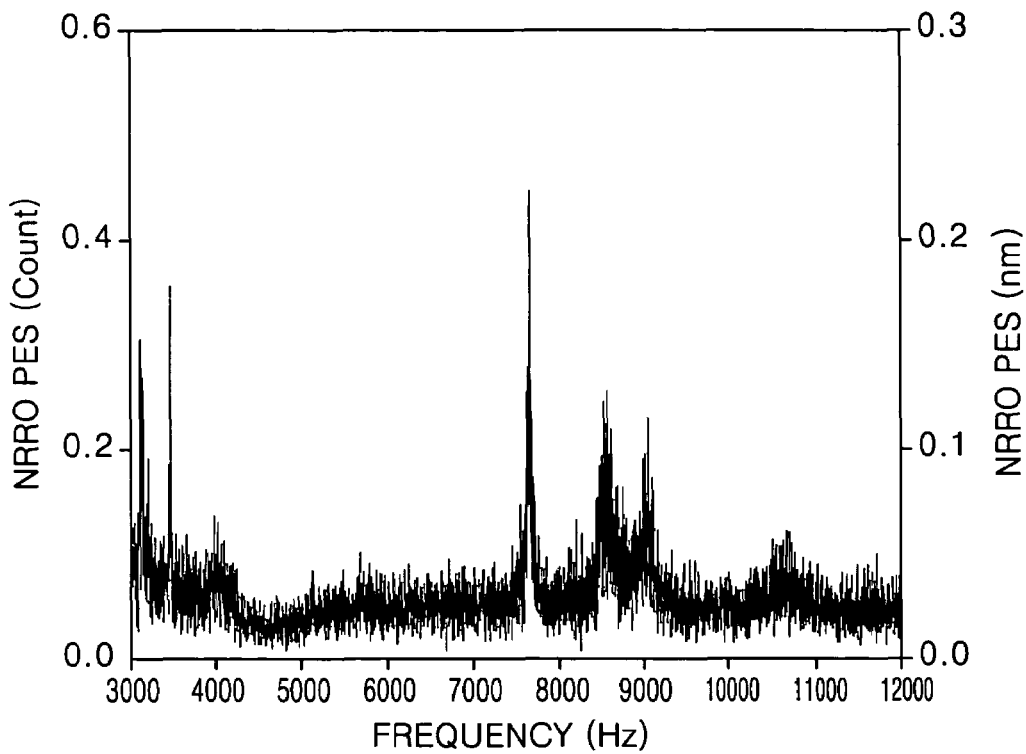
FIGS. 7A and 7B are graphs showing the results of measurements of NRRO PES of the conventional HGA and HGA according to the present invention, respectively.
Figure 7B:
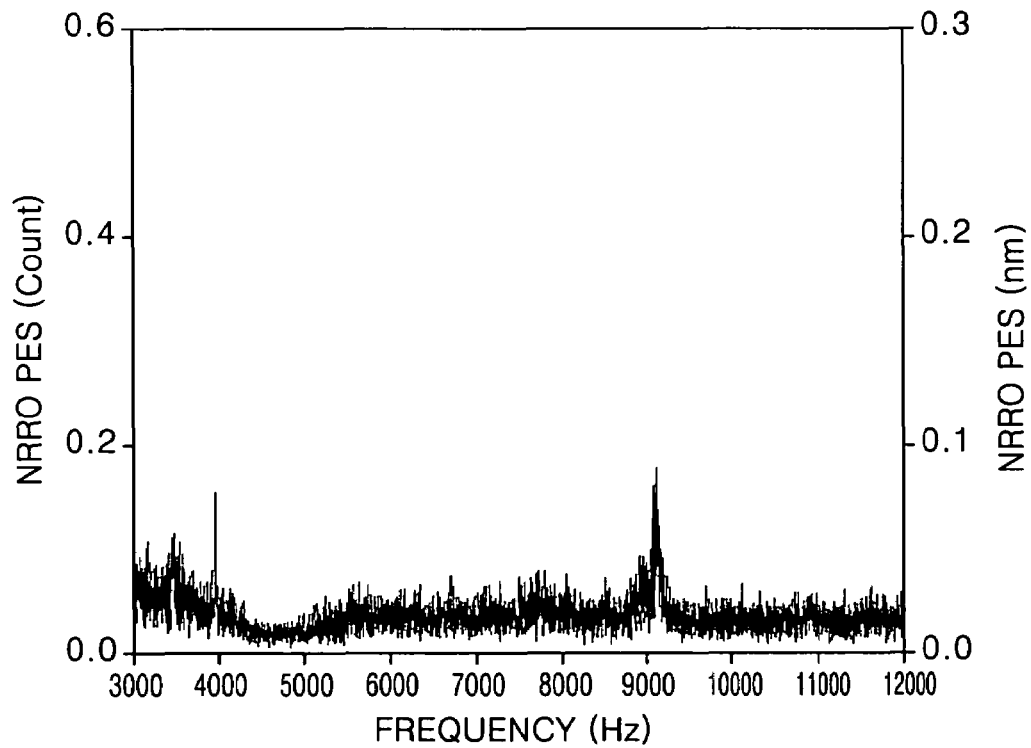
Figure 8A:
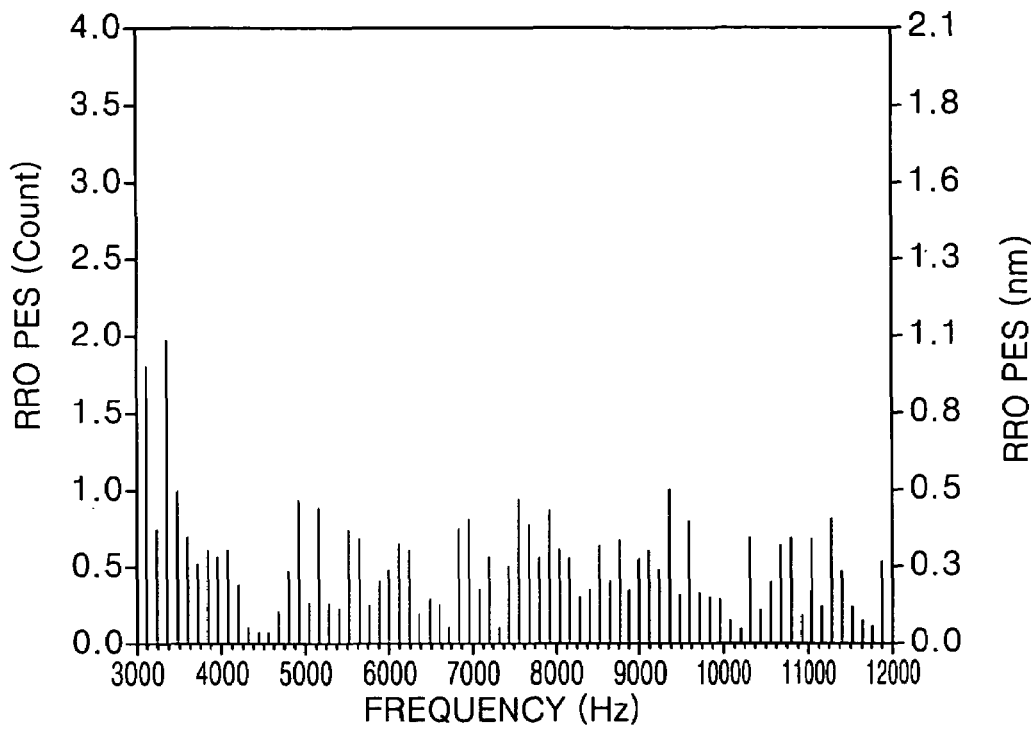
FIGS. 8A and 8B are graphs showing the results of measurements of RRO PES of the conventional HGA and HGA according to the present invention, respectively.
Figure 8B:
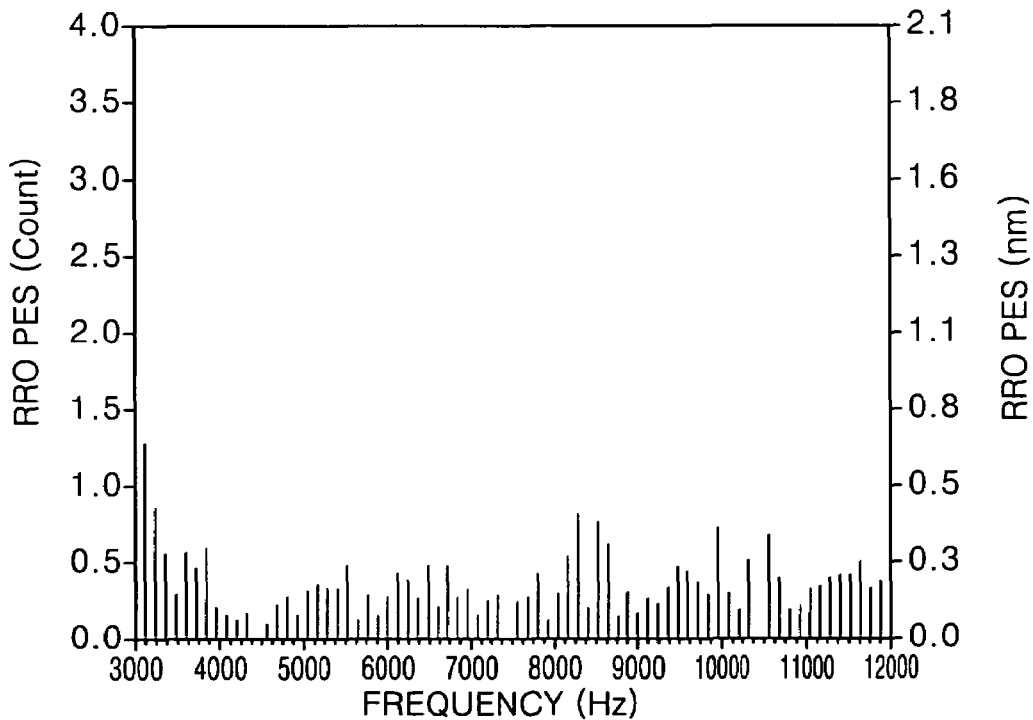

When the damping member 200 is provided, since the vibration transferred from the loadbeam 150 to the slider 120 or from the slider 120 to the loadbeam 150 passes through the damping member 200, influence by the vibration on each other is reduced. To find the effect of the damping member 200 more clearly, NRRO PES (Non-Repeatable Run Out Position Error Signal) and RRO PES (Repeatable Run Out Position Error Signal) of the conventional HGA and HGA according to embodiments of the present invention are measured at a frequency range of 3–12 kHz. Here, RRO PES refers to a position error signal synchronized with the rotation speed of a hard disk and NRRO PES refers to other position error signals which are not synchronized. As a result, it is confirmed that, compared to the conventional technology, NRRO PES is decreased by about 40% on the average, as shown in FIGS. 7A and 7B, and RRO PES is decreased by about 20%, as shown in FIGS. 8A and 8B. This is because the damping member 200 attenuates the vibration transferred between the slider 120 and the loadbeam 150 so that the position error signal is reduced and reliability of a product is improved.

In the above preferred embodiment, as a damper, the damping member 200 is made of a plastic material. However, any means capable of changing attenuation ability, such as a piezoelectric device or a microactuator, may be adopted as the damper. That is, while the damping member 200 is a member of which the attenuation ability is fixed once installed, the piezoelectric device or microactuator is a means of which the attenuation ability can be changed as a displacement is generated according to the supply of current. Thus, by installing the piezoelectric device or microactuator between the portion of the elastic support member 130 where the slider 120 is supported and the load point 151 and controlling current, the attenuation ability is controlled so that a desired attenuation effect can be obtained.

As described above, in HGA of a hard disk drive according to embodiments of the present invention, since the vibration transferred to the slider is attenuated by a predetermined damping means, the influence on the position error signal due to the vibration is reduced and reliability of a product is improved.

What is claimed is:

1. A head-gimbal assembly of a hard disk drive comprising:
    a loadbeam connected to a pivot arm;
    a slider on which a magnetic head is mounted;
    an elastic support member having one end portion coupled to the loadbeam and another end portion on which the slider is supported; and
    a damper provided between the loadbeam and the slider to attenuate vibration transferred between the loadbeam and the slider, said damper including a piezoelectric device that generates displacement commensurate with the current applied thereto.

2. The head-gimbal assembly as claimed in claim 1, wherein a load point is formed at the loadbeam protruding toward the slider and the damper is interposed between a portion of the elastic support member where the slide is supported and the load point.

3. A head-gimbal assembly of a hard disk drive comprising:
    a loadbeam connected to a pivot arm;
    a slider on which a magnetic head is mounted;
    an elastic support member having one end portion coupled to the loadbeam and another end portion on which the slider is supported; and
    a dampter provided between the loadbeam and the slider to attenuate vibration transferred between the loadbeam and the slider, wherein the damper comprises amicroactuator which selectively adjusts attenuation ability according to the supply of current.

4. The head-gimbal assembly as claimed in claim 3, wherein a load point is formed at the loadbeam protruding toward the slider and the damper is interposed between a portion of the elastic support member where the slider is supported and the load point.

* * * * *